May 24, 1927.

R. D. HILL ET AL 1,629,662

JERK LINE BREAK OUT PULLEY

Filed July 12, 1926

Richard D. Hill
Walter W. Foster
INVENTOR.

BY

ATTORNEY.

Patented May 24, 1927.

1,629,662

UNITED STATES PATENT OFFICE.

RICHARD D. HILL AND WALTER W. FOSTER, OF WICHITA FALLS, TEXAS.

JERK-LINE BREAK-OUT PULLEY.

Application filed July 12, 1926. Serial No. 121,895.

This invention relates to well drilling machinery and more particularly to an automatic jerk line control or break out pulley, its principal object being to provide a device of the character designated for mechanically moving the tongs in making up and breaking out casing.

A further object of the invention resides in its comparative simplicity, durability and apparent safety to the operator since the line controlling the tongs is constantly held under tension, thus preventing any possibility of entanglement.

Further, the invention aims among its objects to provide an improved line reciprocating apparatus, deriving its power of operation from the draw works line shaft when needed, its connection with the shaft being controlled at will, enabling it to remain idle when not in use to avoid wear upon either the shaft or device.

A particularly important object of the invention resides in certain provisions made in its construction whereby to enable the rig to be dismounted and transported to another location without requiring that the device be removed from its position on the jack post, from which point it operates.

Other objects and advantages of the invention reside in its salient features of construction and assembly of parts, and will become apparent as the description proceeds, taken in connection with the accompanying drawings, wherein.

The present method of assembling and dismantling well casing is of course well known to those familiar with the art, and while numerous tools and devices have heretofore been contrived for the purpose of expediting this particular phase of the industry, some of these tools and apparatus have been found to be defective in various ways, particularly in cases where no provisions are made therein to disengage them from the constantly revolving line shaft, and as a consequence frictional wear upon the shaft and the device is such that the tool becomes prematurely impaired and inoperative.

In order to obviate as much as possible wear upon the vital parts of the invention, a mounting has been devised whereby the rotating pulley, although operated from the shaft, will not be in contact therewith, and as a further expedient to avoid unnecessary wear, a lubricating arrangement has been carried out in the structure.

Figure 1:
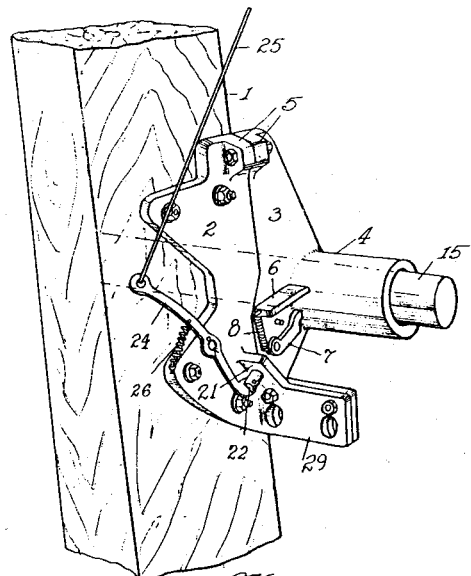
Figure 1 is a perspective view of the pulley mounting, illustrating its position on the jack post.

With the foregoing in view, attention is primarily directed to Figure 1 of the drawings, illustrating the draw works post or more commonly termed jack post 1, on which is mounted the brackets supporting the rotating pulley, the former being divided into sections and will be referred to as 2 and 3, and integral with the section 3 is a tubular bushing 4. The bracket section 2 as will be observed, is securely bolted to the jack post 1, and is not usually moved from this position, while the section 3, carrying the pulley, later referred to is bolted, by means of the ears 5 to the bracket 2.

Figure 2:
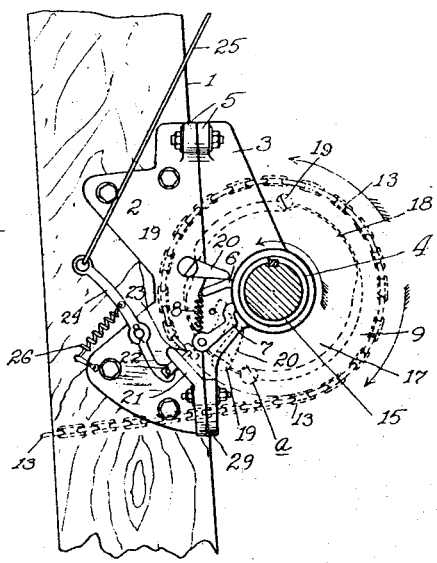
Figure 2 is likewise a view of the mounting with the pulley suggested in broken lines, and further depicting the interlocking arrangement.

Carried likewise by the section 3 as an integral part, and as clearly illustrated in Figures 1 and 2 is an abutment or projection 6, also a yieldable detent 7 such yieldability being obtained through the tension spring 8.

Figure 3:
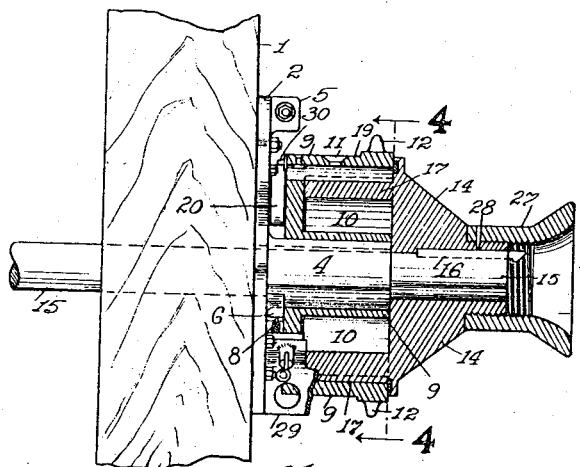
Figure 3 represents an elevational view of the invention in axial cross-section.

The Figure 3 comprehensively illustrates the manner in which the pulley 9, as the case may be, is freely mounted upon the bushing 4, the projection 6 acting in an auxiliary capacity as a stop therefor. It will be observed that the interior of the pulley is cast hollow, and by which is formed a chamber 10 in which is contained heavy lubricating oil, the latter being introduced therein through the aperture 11, see Figure 3. The edge of the pulley 9 most remote from the post has thereon an annular sprocket flange 12, preferably integral also, which may, with a sprocket chain, be substituted for the smooth surface of the pulley where the usual link chain 13, or cable is used, in cases where a greater and more positive pulling power is required.

Referring now more particularly to the core 14 as a means for communicating rotation of the line shaft 15, to the pulley 9. It will be noted that an annular space is provided intermediate the shaft 15 and bushing 4 whereby to insure against contact. The core 14 is affixed by means of a feather key 16 securely to the line shaft 15, and with which it constantly rotates. A reduced portion 17 of the core, which will be termed hereinafter a flange, rotates within the pulley 9, and reference to Figure 4 will disclose that this flange is formed with preferably two opposed projections or stops 18, having gradual lift portions and abrupt drop portions. These stops are adapted, during rotation of the shaft and core to engage successively with a locking pin 19, of semi-cylindrical form, as shown in detail in Figure 5, and which is carried by the pulley 9, at a point near its outer periphery, and arranged to be rotated a limited extent with respect to the pulley. See Figures 3 and 4.

The pin 19 is provided with a tail portion 20, depending therefrom at an angle with respect to the flat face portion thereof, and from its position adjacent the outer edge of the pulley, the free end of the tail 20 will effectively engage with either the abutment 6 hereinbefore referred to or the yieldable detent 7, depending upon the direction of travel of the pulley. This arrangement will be more comprehensively defined in the description of operation presently.

Figure 4:
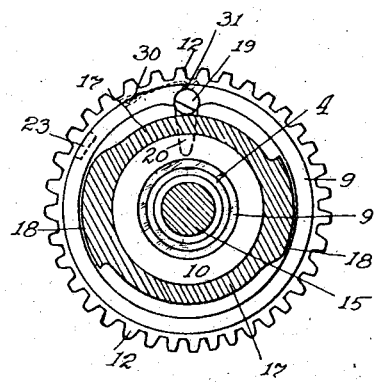
Figure 4 is a partial sectional view on line 4—4 of Figure 3.
Figure 5:
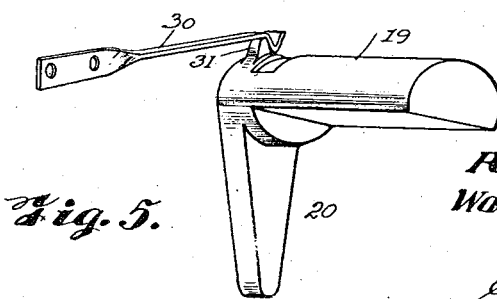
Figure 5 is a detail view of the locking pin.

Returning to the bracket section 2, it will be observed that a projection 21 is formed thereon to aline with the circular path of the pulley 9, and a pin 22 enters through an aperture in this projection and engages the pulley 9 in a slot 23, see Figures 2 and 4, to hold the pulley against rotation while inoperative. The pin, as apparent in Figures 1 and 2 is controlled by a lever 24 and line 25, the lever 24 being under tension of a small spring 26 to normally hold the pin 22 against the surface of the pulley 9.

As a further expedient directed toward the efficiency of the invention, the core 14 is so constructed as to provide for the application of a spool attachment 27, see Figure 3, which is threaded upon the protruding core to complete a "cat head" and which attachment is held by a pin 28.

Referring now particularly to the ordinary operation of the device and such elements as are brought into function in the operation; the pulley 9, being freely mounted upon the bushing 4, is not in any wise connected with the shaft 15, and the chain 13 affixed at a predetermined point on the surface of the pulley, is directed through one of the alining apertures in the projecting plate 29, to a point where it is attached to the casing tongs, not shown. It will be understood in continuing that while the tongs are oscillated, pulling power is supplied only in one direction by the invention, return engagement of the tongs on the casing being obtained either by suitable springs, weights, or manually, as desired, since no extraordinary power is required in this regard.

In order to communicate rotation of the shaft 15 to the pulley 9, it being borne in mind that the core 14 is constantly rotating with the shaft, the line 25, depending at a point accessible to the operator is pulled, releasing the pulley 9, the tongs are rotated to partially unwind the chain 13, and move the locking pin 19 to the position illustrated in Figure 2 in dotted lines. Since the pin upon reaching this position is so disposed as to permit free and unrestricted passage of the stops 18 of the flange 17, that is, the flat surface thereof is alined with the circular path of these stops, it is the purpose now to revolve the pin until the same assumes a position such as shown at *a* in dotted lines in Figure 2, whereby to effect engagement with one of the stops 18 during rotation. This action is effected by engagement of the tail 20 of the pin with the detent 7. To prevent possible displacement from proper position, a leaf spring 30 is provided, having one of its ends fixed to the pulley 9, adjacent the pin 19, while its free end yieldingly engages a projection 31 on the pin. See Figure 5 especially.

After the pin 19 is turned to the position shown at *a* in Figure 2, it is caught by one of the stops 18 in passing, and is thereby carried around to the position shown in solid lines in Figure 2, thus moving the pulley 9, and exerting a pull upon the chain 13. The tail 20 of the pin effects an engagement with the fixed abutment 6, and since the latter is placed at an angle corresponding with that of the flat surface of the pin 19, the said flat surface is turned to a position in alinement with the circular path of the stops 18, permitting the latter to pass unrestrictedly thereunder, and simultaneous with the turning of the pin, the pulley holding means, constituting the lever 24, pin 22 and line 25 automatically restrains the pulley from further rotation, however, the core flange 17 continues to revolve within the pulley 9.

It is often the case during operation of the device, that the flat surface of the pin 19 will be caught directly on top of one of the stops 18, and should the tail 20 engage with a fixed abutment, damage to the pin or its associated elements would result, hence the detent 7 is arranged to yield to the impact a limited degree, or sufficiently to permit the stop to move from under the pin permitting the latter to turn into the path of the following stop, to further rotate the pulley.

It is not necessary that the invention be restricted to use in connection with the control of the jerk line for breaking out and making up casing, since its effectiveness is equally as valuable when employed for driving piles, pipe and many other similar uses where a reciprocating action is desirable or required, nor is it desired that the invention be limited in structure and assembly of parts, since it is understood that some variation is possible without departing from the spirit and scope thereof, as set forth in the following claims:

1. An automatic jerk line control including a revolvable shaft; a bushing surrounding said shaft and held against rotation; a pulley freely mounted on said bushing and carrying said jerk line; a core fixed to said shaft, a portion of which is operable within said pulley and having projections thereon; a locking pin carried by said pulley having limited rotative movement, and arranged for successive engagement with said projections to lock said core and pulley in common rotation, fixed means to engage with and rotate said pin to disengage said core and pulley, yieldable means for moving said pin into position for engagement by one of said projections, and means for holding said pulley against rotation.

2. An automatic jerk line control including a rotating shaft; a bushing surrounding said shaft and held against rotation; a combined pulley and sprocket freely mounted on said bushing, a line carried by said pulley; a core fixed to said shaft having an annular flange carrying opposed projections and arranged to operate within said pulley; a semi-cylindrical pin mounted for limited rotation intermediate said pulley and flange surface; means to cause said pin to move out of the circular path of said projections to disengage said core and pulley; means arranged to yieldingly move said pin to a position to be engaged by one of said projections to lock said core and pulley in common rotation, and means to hold said pulley from rotation when disengaged from said core.

3. An automatic jerk line control including a revolving shaft, a sectional bracket, an integral bushing carried by one of said sections and arranged to surround said shaft, a member freely mounted on said bushing; a line wound about said member; a flanged core fixed to said shaft; said flange provided with opposed projections; means cooperable with said projections and first member to lock the said member and core in common rotation with said shaft; means engageable by said locking member during rotation of said core and first member to cause the same to release said members and means to hold said first member against rotation.

4. An automatic jerk line control including a constantly rotating shaft; a fixed sectional bracket; an integral bushing on one of said sections and surrounding said shaft, an angular abutment adjacent said bushing; a pulley freely mounted on said bushing; a core fixed to said shaft and arranged to be operable interiorly of said pulley; projections carried by said core, means co-operable with said pulley and core to lock the same in common rotative movement with said shaft; means to release said locking means by its engagement with said abutment, and means to hold said pulley against rotation irrespective of said core and shaft.

5. An automatic jerk line control including in combination a revolving shaft; a bracket comprising fixed detachable sections; one of said sections carrying a bushing arranged to be non-rotatably mounted over said shaft; a pulley freely mounted on said bushing having a line wound thereon; a core fixed to said shaft and operable in said pulley; a member co-operable with said core and pulley to lock the same in common rotative movement with said shaft; means integral with one of said bracket sections to be engaged by said locking member to move the same to disengage said core and pulley, and means to hold said pulley against rotation irrespective of said core and shaft.

6. An apparatus of the character described including a revolving shaft; a bracket in sections; a bushing carried by one of said sections; a pulley carried by said bushing; a core fixed to said shaft and operable in said pulley; a member co-operable with said core and pulley to successively lock the same in common rotative movement with said shaft; means spaced on said bracket sections to be engaged by said locking member to cause the same to effect alternate engagement and disengagement of said core and pulley, and means to hold the latter against rotation.

7. An apparatus of the character described including a revolving shaft; a fixed bushing surrounding said shaft; a pulley freely mounted on said bushing; a line having one end fixed to said pulley; a flanged member fixed to said shaft arranged to move within said pulley, said flange carrying stops; means intermediate said pulley and flange co-operable with said stops to lock said flanged member and pulley in common rotation with said shaft, and means engageable by said locking member to effect alternate engagement and disengagement of said flanged member and pulley accordingly with the motion of said pulley.

8. An apparatus of the character described including in combination a revolving shaft; a fixed bushing; a member carried by said bushing having a line fixed thereto; a flanged member carried by said shaft, said flange arranged to operate freely within said pulley; stops spaced on said flange, and means carried by said pulley and co-operable with said stops to effect engagement and disengagement of said flanged member and first member accordingly with the motion of said first member.

In testimony whereof we affix our signatures.

RICHARD D. HILL.
WALTER W. FOSTER.